June 19, 1945. A. C. DURDIN, 3D 2,378,756
SEWAGE TREATMENT
Filed Aug. 3, 1940
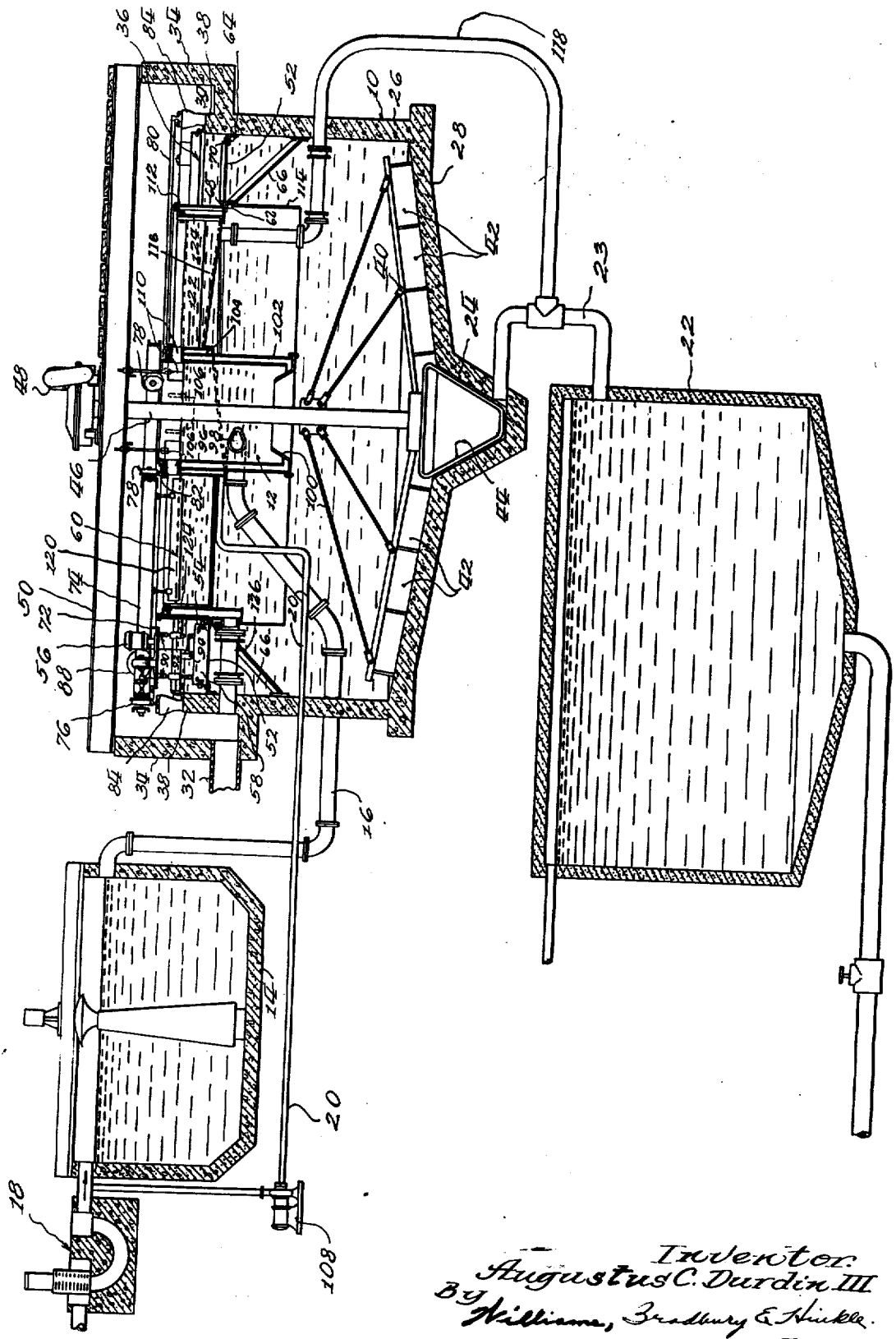
Inventor.
Augustus C. Durdin III
By Williams, Bradbury & Hinkle.
Attys Patented June 19, 1945

2,378,756

UNITED STATES PATENT OFFICE 2,378,756

SEWAGE TREATMENT

Augustus C. Durdin, III, Niles Center, Ill.

Application August 3, 1940, Serial No. 350,214

4 Claims. (Cl. 210—8)

The present invention relates to improvements in sewage treatment and particularly to treatment of sewage by the activated sludge process.

The primary object of the present invention is the provision of a new and improved method and apparatus for treating sewage.

One of the objects of the present invention is in the provision of a new and improved method of treating sewage by an activated sludge process that comprises in treating (i. e., in "seeding") raw sewage with a highly virile and aerobic sludge obtained from a settling tank prior to the settling of that sludge to the bottom of the tank.

A further object of the present invention resides in the provision of a new and improved method for classifying the sludge in the settling tank, whereby highly virile and aerobic sludge is uniformly and effectively separated from the heavier and non-aerobic sludge.

A further and somewhat broader object of the invention is the provision of a new and improved method of classifying that comprises injecting liquid entraining the materials to be classified into a substantially cylindrical vertically disposed vessel tangentially to the inner side walls of the vessel, whereby the heavier materials congregate at the center of the vessel and the lighter material near the inner wall of the vessel.

A further object of the present invention is in the provision of apparatus for carrying out the methods described above.

A further object of the present invention is in the provision of a classifier operating according to the principles outlined above with means whereby the separated materials may be readily and uniformly separated.

A further object of the present invention is in the provision of new and improved means for collecting the lighter materials, which in the case of the sewage treatment herein under consideration is the highly virile and aerobic sludge, so that it may be readily supplied for mixture with the raw sewage.

A further object of the present invention is to provide a classifier of the type mentioned above, with means for disposing of any scum that is likely to form therein.

Another object of the present invention resides in the provision of a new and improved means for disposing of any scum appearing at the surface of the liquid in the settling tank.

A further object of the present invention is to provide a settling tank of the type provided with a filter with new and improved apparatus for cleaning the filter.

Another object of the present invention resides in the provision of a settling tank with new and improved means for preventing damage to the equipment and for preventing undue upsetting of the treating system in case the tank is accidentally or otherwise supplied with excessive sewage or liquid.

Other objects and advantages of the present invention will become apparent from the ensuing description, in the course of which reference is had to the accompanying drawing, the single figure of which illustrates somewhat diagrammatically apparatus for carrying out the methods of the present invention, which includes a settling tank embodying other features of the invention.

The sewage treatment apparatus illustrated in the figure consists of, in the main, a settling tank 10, centrally of which is located the classifier 12 forming one of the important features of the present invention, an aeration tank 14 connected by a conduit 16 to the classifier and supplied with raw sewage through a comminutor 18 and, in accordance with another feature of the present invention, with highly virile and aerobic sludge from the classifier through conduit 20 and, finally, of a sludge digestion tank 22. The latter is connected by conduit 23 to a sump 24 formed centrally and at the lowermost portion of the settling tank. To avoid the use of a pump for forcing sewage from the aeration tank to the settling tank, the level of sewage in the aeration tank may be maintained about six or eight inches above the liquid level in the settling tank.

The settling tank 10 may take any desired shape and has been illustrated, for example, as circular and is preferably provided with concrete side walls 26 and a concrete bottom 28 sloping toward the sump 24. An annular clear liquid launder 30 is provided to receive discharged clear liquid, and in order more effectively to dispose of the latter, the launder is inclined toward a conduit 32 provided for the purpose of carrying off clear filtered liquid. The launder 30 is defined by an upstanding outer wall 34 forming part of the main concrete side walls and an annular inner weir or overflow baffle 36 comprising a metal plate suitably secured to an angle iron fastened to a portion 38 of the side walls 26 extending above the level of the launder 30.

The lower portion of the settling tank 10 constitutes a sedimentation zone. The sludge collecting at the bottom is scraped toward the sump by a scraper consisting of a frame 40 upon which is mounted a plurality of scrapers 42 for scraping the sediment or sludge at the bottom of the tank into the sump 24, and a centrally disposed scraper 44 extending into the sump, the purpose of which is to assist in the discharge of the sludge into the digestion tank through the pipe 23.

The sludge scraper is supported on a central upright shaft 46 rotated by suitable drive means such, for example, as an electric motor 48. The scraper and its driving mechanism are supported on a pair of I-beams 50 (only one of which is shown in the figure) extending across and supported by the annular tank wall 34.

The settling tank includes filtering means 52 which may be a cloth or wire screen having an annular shape and located near the inner periphery of the settling tank and below the normal water level in the latter, so that the liquid flowing into the launder passes therethrough in an upward direction. The filtering means is cleaned by forcing clear liquid collected at a point above the filtering means downwardly through the screen by cleaning apparatus including a liquid pump 54, a pump motor 56, and a back-wash pressure chamber 58 directly above the filtering means.

The above described type of filter and filter cleaning means, broadly considered, does not constitute any part of the present invention, although the present invention does include improvements in the construction and arrangement of the cleaning apparatus, which improvements will be described shortly. The above described type of filtering and cleaning means is disclosed in Patent No. 2,065,836, granted on December 29, 1936, to Paul A. Thayer.

The filtering means is, as has already been indicated, located below the normal liquid level in the settling tank, which level is determined by the top of the weir 36. This normal level is indicated by a line denoted by reference character 60. The filtering means is preferably supported on a pair of spaced-apart annular angle irons 62 and 64, the former of which is supported by a number of angularly disposed brackets 66 and the latter upon the concrete side walls 26. The annular angle iron supports 62 and 64 have mounted thereon annular angle iron tracks 68 and 70, respectively, for a purpose which will appear shortly.

The cleaning apparatus is mounted for rotation around the tank so that only a limited portion of the filtering means is cleaned at any one time. The construction of the cleaning apparatus is simplified considerably by mounting the pump 54 below the liquid level and the motor 56 above the liquid level. These two elements of the cleaning apparatus are supported in this manner upon a base plate 72 supported, in turn, upon a pair of spaced-apart, generally radially disposed arms 74 (only one of which is illustrated) mounted for rotation around the tank. The outer ends of the supports 74 are secured in suitable manner to a pair of wheels 76 (only one of which is shown) and the inner side of the supports are most conveniently secured to three equidistantly spaced-apart wheels 78 (only two of which are shown). The two sets of wheels 76 and 78 are mounted for rotation upon outer and inner tracks 80 and 82, respectively. Track 80 is suitably supported above the liquid level by a number of spaced-apart supporting plates 84 secured to portion 38 of the tank wall, and track 82 is similarly mounted above the upper end of the centrally disposed classifier 12 heretofore referred to. The cleaning apparatus is propelled around the settling tank by a motor 86 suitably coupled through gear reduction apparatus to one of the wheels 76 and mounted upon the base plate 72.

According to another of the features of this invention the back-wash pressure chamber 58 is mounted directly above the filtering means 52 and is connected in articulated manner to the cleaning apparatus propelling mechanism. The chamber is provided with a plurality of spaced-apart rollers engaging the previously mentioned tracks 68 and 70, so that it is at all times maintained in close contact with the filtering means, irrespective of variations in level and lateral displacement between the propelling mechanism and filtering means. The articulated connection between the back-wash pressure chamber and propelling mechanism is provided by a pair of hanger arms 90, each of which comprises a pair of swiveled connections and a pair of telescopically arranged tubes 92. Liquid is supplied to the back-wash pressure chamber through a pipe 94 connected to the pump discharge, as by a flexible hose connection (not shown), whereby the position of the chamber to the filtering means is not affected by the location of either the propelling mechanism or pump.

One of the primary features of the present invention resides in the provision of a new and improved method of activated sludge sewage treatment which consists in treating (i. e. "seeding") the raw sewage with a highly virile and aerobic sludge. This sludge is obtained from the settling tank prior to the time it settles and is separated from the heavier, non-aerobic and less virile sludge settling to the bottom of the tank and which has heretofore been used in such treatment of the raw sewage.

The supply of this highly virile and aerobic sludge is obtained by means of the classifier 12 which operates and is constructed upon entirely new principles to insure an effective and uniform separation of the aerobic from the non-aerobic sludge.

The classifier consists of a generally cylindrical shell 96 suspended in suitable manner from the beams 50 and extending into the tank a distance somewhat less than half the depth of the liquid. Sewage from the aeration tank is injected tangentially into the classifier through an opening 98 located approximately midway between the bottom of the shell 96 and the liquid level. When the liquid is thus injected at a velocity dependent mainly upon the characteristics of the sludge and proportions of the classifier and sewage conduit, the sewage flows around the tank and the heavier and less aerobic sludge gathers in the center of the classifier and falls through the open lower end thereof to the bottom of the tank while the lighter, highly virile and aerobic sludge gathers nearer the inner wall of the classifier.

The lighter, highly virile and aerobic sludge is prevented from falling to the bottom of the settling tank and is utilized to "seed" the sewage supplied to the aeration tank, as previously mentioned. This lighter sludge is prevented from falling to the bottom by an annular upwardly inclined and centrally extending baffle 100 suitably secured to the lower end of a second cylindrical shell 102 concentric to and extending somewhat below shell 96. Shells 96 and 102 define an annular vertical passageway surrounding the classifier per se, up which the lighter sludge flows to be discharged into an annular hopper 104 surrounding shell 102. The sludge is discharged into the hopper through a plurality of weirs (for instance 8) constituted by rectangular slots 106 formed at the upper end of shell 102. The lower ends of the slots are at the liquid level obtaining in the tank so that the light sludge gradually flows into the hopper.

The hopper is constructed with a bottom inclining toward the sludge return conduit 20 leading to the inlet end of the aeration tank. The conduit 20 is preferably provided with a pump 108 for the purpose of securing an adequate flow of sludge to the aeration tank. Other means for securing an adequate flow may be used. For instance, an air lift may be used, in which event the hopper should be made with a depth sufficient to create an adequate submergence to permit the air lift to raise the sludge somewhat above the level of sewage in the aeration tank.

The structural details of the classifier, deflector and hopper may be varied, but a very economical and readily fabricated structure is obtained by supporting the shell 102 by welding it to the bottom of the hopper. The hopper is suspended from suitable superstructure that also supports track 82.

Scum forming at the top of the liquid in the classifier is disposed of through a plurality (say eight) openings 110 leading from the interior of the classifier to the exterior of the hopper. The openings are preferably rectangular in section and have their lower ends at the liquid level so that the scum will flow thereover into the portion of the tank located between the hopper and filtering means. The openings 110 are preferably located in staggered relation to the slots 106 in shell 102.

The heaviest part of the sludge flowing past deflector plate 100 falls directly to the central part of the bottom of the settling tank and the lighter parts at points therebetween and the tank wall. All but the lightest parts of this sludge are prevented from reaching the filtering means by downwardly extending baffle structure comprising annular plates 112 and 114 supported above and below the annular angle iron filtering means support 68.

Scum forming at the top of the liquid between the baffle structure and hopper, or flowing into this region from the upper part of the classifier is collected in a rectangular hopper 116 having a bottom inclined downwardly and outwardly whence it is discharged into the digester tank 22 through conduits 118 and 23. The scum is carried into the hopper by a scrapper blade 120 hingedly supported from one of the propelling mechanism supports 74. The scum is effectively prevented from collecting at the sides of the hopper by a pair of aprons 122 (only one of which is shown) extending outwardly and downwardly from the sides of the hopper. The aprons are made sufficiently wide to prevent the scum from getting caught underneath them.

To prevent damage to the equipment and to minimize impairment of the treating process as a result of accidental excessive supply of sewage, there is provided an overflow system that discharges into the clear liquid launder 30. This system comprises an annular passageway defined by the baffle plate 112 and an annular plate 124, the upper end of which determines the overflow level. Plate 124 is concentric to and of lesser diameter than plate 112. The overflow passageway defined by the two plates discharges into a conduit 126 opening into launder 30.

If an excessive supply of sewage is supplied to the settling tank, the liquid level in the portion between the hopper 104 and baffle 112 rises until the liquid is discharged into the launder. The various motors are thus protected against damage and the danger of the application of excessive pressure against the filtering means is avoided. If no overflow were provided the resulting excessive pressure against the filtering means would force unusually heavy sludge thereagainst and very likely clog it and thereby disrupt proper operation of the apparatus.

In operation of the apparatus the raw sewage from the comminutor 18 is mixed with the highly virile light sludge obtained from the settling tank and the mixture supplied to the aeration tank. From the aeration tank the sewage flows by gravity to the classifier 12 through conduit 16. The sewage is discharged tangentially into the classifier and as a result of the whirling motion imparted to the sewage in the classifier, the light and highly active portion is forced to the outside, while the heavier and less active portions gather at the center.

The highly active portion is caused by deflector plate 100 to flow into the passageway defined by shells 96 and 102, whence it flows into hopper 104 through weirs 106. The sludge collected in the hopper is withdrawn by the pump 108 and discharged into the aeration tank along with raw sewage. The use of the highly active light sludge provides a very effective method of sewage treatment as this sludge is more effective upon the raw sewage than sludge collected from the bottom of the tank.

The heavier sludge either falls directly to the bottom of the tank or settles therein as the liquid flows to the launder through the filtering means. The filtering means is effective to arrest solids, even in colloidal form, and prevent their flow to the launder. These solids collect on the filtering means and in time fall to the bottom of the tank. All the sludge and solid material collected at the bottom of the tank is scraped into the sump and then discharged into the digestion tank.

The filtering means is cleaned, as already described, by forcing clear filtered liquid downwardly therethrough by means of the pump. A very effective and uniform cleaning is obtained by mounting the pressure chamber 58 directly over the filtering means and supporting it on a track independently of the propelling mechanism. The mounting of the pump below the liquid level results in shortening the pump conduit connections and more efficient operation of the pump.

The scum formed in the classifier flows into the center region of the tank where it is gathered with the scum formed in that region and deposited in the scum hopper. From the hopper the scum is discharged into the digestion tank.

Overflowing of the sewage into the filtering means and the building of excessive pressures against the filtering means is prevented by the overflow system discharging into the launder through conduit 126.

Although this invention has been described in considerable detail, it is to be understood that the description is intended to be illustrative and not limiting in nature, as the invention may be embodied in various forms of structure and apparatus.

I claim:

1. A classifier for liquid borne materials, including in combination, a generally cylindrical and generally vertically disposed open bottom chamber, means for injecting liquid into said chamber tangentially to the side walls thereof and effecting slow downward movement of the liquid in the chamber, thereby to gather the heavy and light materials in central and outer zones of the chamber, and means for causing the liquid in said zones to follow separate paths thereby to effect separation of the materials, said last mentioned means including an annular passageway concentric to and surrounding the chamber and a centrally open annular inwardly and upwardly extending deflector the lower portion of which is located below the lower end of the chamber to provide communication between the annular passageway and chamber.

2. A classifier for sludge supplied to a settling tank, including in combination, a generally cylindrical and generally vertically disposed open bottom baffle located centrally of the tank and extending from above the normal liquid level in the tank a considerable distance below the liquid level, means located between the liquid level and bottom of the baffle for injecting liquid inside said baffle tangentially to the side walls thereof, thereby to gather the heavy and light materials in central and outer concentric zones within the baffle, a cylindrical plate concentric to and spaced outwardly from the baffle to define an annular passageway, a centrally open deflector secured to said plate below the baffle and extending upwardly and toward the central zone within the baffle for effecting separation of the liquids in the two zones, whereby the liquid in the central zone flows into the settling tank and the liquid in the outer zone flows into said annular passageway, means associated with said passageway for collecting the light sludge, said last mentioned means including a hopper surrounding said cylindrical plate and communicating with said annular passageway by means of slots at the upper end of said plate extending downwardly approximately to the normal liquid level in the tank, and sludge outlet means associated with said hopper.

3. A classifier according to claim 2, wherein passageways extending from within the baffle to the exterior of the hopper and located immediately above the normal liquid level in the tank are provided for the purpose of disposing of scum collecting within the baffle.

4. In a settling tank of the type having a peripheral launder and a peripheral filter through which clarified liquid flows upwardly into the launder, a tubular baffle into which material to be settled is discharged, and a second baffle extending from above to below the top of the launder adjacent the inner side of the filter, an overflow device including in combination, means including generally a cylindrical and vertically extending wall located inwardly of the second baffle and extending downwardly from above to below the top of the launder in the tank and having an overflow outlet above the top of the launder out below the top of the second baffle, means for closing the space between the lower portion of the wall and the second baffle, thereby to constitute an overflow chamber located inwardly of the second baffle and communicating with the interior of the tank inwardly of and below the top of the second baffle and above the top of the launder within the tank, and conduit means below the top of the launder in the tank for connecting said chamber to the launder and conducting overflow to the launder.

AUGUSTUS C. DURDIN, III.